US009284896B2

(12) United States Patent
Atluru et al.

(10) Patent No.: US 9,284,896 B2
(45) Date of Patent: Mar. 15, 2016

(54) METHOD FOR MAXIMIZING MICROHYBRID AUTO START-STOP AVAILABILITY

(71) Applicant: FORD GLOBAL TECHNOLOGIES, LLC, Dearborn, MI (US)

(72) Inventors: Ravi Atluru, Westland, MI (US); Chuck De Biasi, Plymouth, MI (US); Xiangying Liu, Ann Arbor, MI (US); Zeljko Deljevic, Plymouth, MI (US); David Celinski, Wolverine Lake, MI (US); David Anthony Symonow, Plymouth, MI (US); Eric Michael Rademacher, Royal Oak, MI (US); Kirk Pebley, Novi, MI (US); Dave W. Linden, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 557 days.

(21) Appl. No.: 13/754,930

(22) Filed: Jan. 31, 2013

(65) Prior Publication Data

US 2014/0214309 A1    Jul. 31, 2014

(51) Int. Cl.
*B60L 9/00*    (2006.01)
*F02D 35/00*   (2006.01)
*F02N 11/08*   (2006.01)

(52) U.S. Cl.
CPC ........ *F02D 35/0007* (2013.01); *F02N 11/0825* (2013.01); *F02N 2200/023* (2013.01); *F02N 2200/044* (2013.01); *F02N 2200/046* (2013.01); *F02N 2200/061* (2013.01); *F02N 2200/063* (2013.01); *Y02T 10/48* (2013.01)

(58) Field of Classification Search
CPC ...... B60W 10/08; B60W 20/40; G01R 31/36; H02J 7/00
USPC .................. 701/22; 180/65.28; 903/902, 930; 320/109; 702/63
See application file for complete search history.

(56) References Cited

U.S. PATENT DOCUMENTS

| | | | |
|---|---|---|---|
| 9,014,889 B2 * | 4/2015 | Ando et al. ...................... 701/22 |
| 2013/0020994 A1 * | 1/2013 | Christen et al. ............... 320/109 |
| 2013/0179018 A1 * | 7/2013 | Yamamoto et al. ............. 701/22 |
| 2014/0121865 A1 * | 5/2014 | Anderson ....................... 701/22 |

* cited by examiner

*Primary Examiner* — Luke Huynh
(74) *Attorney, Agent, or Firm* — Joseph E. Root

(57) ABSTRACT

A method for maximizing the availability of start-stop operations within a microhybrid vehicle includes determining the electric current drawn by a set of electrical components of the vehicle, from the vehicle's battery. The internal resistance of the vehicle's battery, and the resistance of a starter motor loop circuit coupled to the engine of the vehicle are dynamically calculated. The closed-circuit voltage of the battery is predicted, using the internal resistance of the battery, the resistance of the starter motor loop circuit, and the current drawn by the set of electrical components of the vehicle. The start-stop operation is carried out if the closed-circuit voltage of the battery is predicted to be above a pre-determined minimum value.

7 Claims, 3 Drawing Sheets

METHOD FOR MAXIMIZING MICROHYBRID AUTO START-STOP AVAILABILITY

TECHNICAL FIELD

Embodiments of the present disclosure generally relate to automotive vehicles, and, more specifically, to microhybrid vehicles equipped with auto Start-stop feature.

BACKGROUND

Microhybrid electric vehicles incorporate start stop systems, which automatically shut down the engine of the vehicle to minimize engine idling conditions when the vehicle is stationary, and restart the engine when the vehicle starts moving again. This substantially reduces the vehicle's fuel consumption, and emissions from the vehicle. Specifically, the start-stop technology is extremely advantageous when a vehicle is running under traffic jams conditions, or it frequently stops and spends significant time at the traffic signals. In most of the microhybrid electric vehicles, the start-stop technology shuts down the engine when the driver presses the brake pedal or the clutch to stop the car. The engine is restarted when the brake pedal is released (in case of automatic transmissions) and/or the clutch is depressed again (in case of vehicles incorporating manual transmission) prior to selecting the gear for moving the car. In certain cases, the vehicle's engine may also restart if the electrical power demanded by one or more vehicle's subsystems, such as, the air conditioning system, is relatively higher.

Alternators are used in microhybrid vehicles to charge the battery, and to power the electrical systems of the vehicle when the engine is running. When the start-stop system of a vehicle turns the engine off, the vehicle's alternator is also switched off, and the major sub-systems of the vehicle, including the infotainment system, the climate control system, etc., draw power from the battery of the vehicle for operation. Since the alternator shuts down in response to the shutting down of the vehicle's engine, the battery cannot be charged, and it starts draining, as the electrical subsystems draw power from the battery of the vehicle. Therefore, the engine may need to be restarted after a specific time, to avoid a condition where the operation of the electrical subsystems of the vehicle may be effected due to battery drainage and corresponding low electrical system voltage. This may occur in a situation where the vehicle's engine has been shut down by the auto start-stop system of the vehicle, for a relatively long time. Further, in a case where the battery of a vehicle drains to a certain minimum level, subsequent low electrical system voltage may cause undesired performance of the electrically driven subsystems.

To overcome the above problem, many microhybrid vehicles monitor various parameters within the vehicle, to minimize obstructions to proper operating conditions of the electrical components and subsystems of the vehicle during engine stop conditions. In some conventional attempts, a battery management module of the vehicle uses a fixed value of the inrush current the starter motor of the vehicle will draw, to determine availability of the engine start-stop feature. The inrush current value at the starter motor of the vehicle' engine directly affects the electrical systems' voltage. However, if the battery management module uses a fixed programmed value for the starter motor inrush current, there may be certain neglected/unidentified cases where the battery of the vehicle may still have enough power, and the stop-start operation may be left unutilized or underutilized. Other attempts to maximize the start-stop operation in a vehicle have also not been substantially successful so far.

Considering the problems mentioned above, and other shortcomings in the art, there exists a need for a method to maximize the availability of start-stop operation in a microhybrid electric vehicle.

SUMMARY

The present disclosure provides a method for maximizing the availability of start-stop feature within a microhybrid electric vehicle, without affecting the operations of the electrical components of the vehicle, drawing power from the battery of the vehicle.

According to one aspect, the present disclosure provides a method for maximizing the availability of start-stop mode of operation for a vehicle's engine. The method includes measuring the electric current (load) drawn by a set of vehicle's electrical components, from the vehicle's battery. The internal resistance of the battery of the vehicle is measured dynamically. Further, during each engine restart operation, the method dynamically determines and records the resistance across the vehicles starter motor loop circuit, which includes the starter motor, solenoid and connected wiring. Then, the method calculates a closed-circuit voltage of the vehicle's battery using the current drawn by the set of electric components, the internal resistance of the battery, and the starter motor loop resistance. Based on the calculated closed-circuit voltage of the battery, the method carries out the start-stop operation for the engine of the vehicle, if the predicted closed circuit voltage is above a certain pre-determined value.

Additional aspects, features, advantages and objects of the present disclosure would be made apparent from the drawings and the detailed description of the illustrative embodiments, construed in conjunction with the appended claims that follow.

DETAILED DESCRIPTION OF ILLUSTRATIVE EMBODIMENTS

The following detailed description illustrates aspects of the claimed invention and the ways to implement it. However, the description is not intended to define or limit the invention, such definition or limitation being solely contained in the claims appended thereto. Although the best mode of carrying out the invention has been disclosed comprehensively, those in the art will recognize that other embodiments for carrying out or practicing the invention are also possible.

The current microhybrid vehicles in the automotive market are equipped with a start-stop feature for the vehicle's engine, and this feature shuts down the engine when the vehicle is nearly stationary. The engine is restarted as the vehicle starts moving again. This minimizes the engine idling conditions, and therefore, reduces fuel consumption and emissions from the vehicle. When the engine is shut down, the electrical components of the vehicle, including the climate control system, the infotainment system, the lighting system, etc., start drawing power from the vehicle's battery, and therefore, the battery may drain with time, if the engine is shut down for an extended period. In a case where the battery drains below a certain level, the operation of the electrical components of the vehicle may be affected. Further, on initiating a restart for the engine after an auto-stop has occurred, the battery should supply a certain minimum voltage. Many of the conventional start-stop systems within vehicles utilize a fixed programmed value for the inrush current at the starter motor coupled to the vehicle's engine, to minimize obstructions to proper functioning of vehicle's electrical components, while the start-stop operations are carried out. This approach may not ensure maximum availability of the start-stop feature.

The present disclosure is directed to a method for maximizing the availability of start-stop feature in a microhybrid vehicle, without affecting the operation of the vehicle's electrical components, such as the infotainment system, the climate control system, etc.

Figure 1:
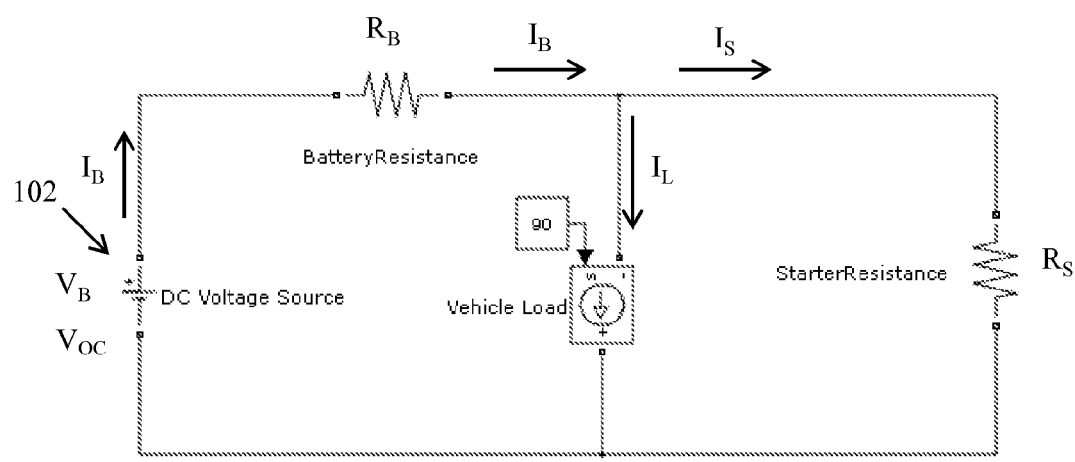
FIG. 1 is an electrical circuit representing a battery coupled to a set of electrical components and a starter motor of a vehicle, according to an embodiment of the present disclosure.

The method of the present disclosure is now explained in conjunction with the electrical circuit depicted in FIG. 1.

In the illustrated circuit, the parameters pertaining to calculations involved in the method of the present disclosure are denoted as follows:

$V_B$=Closed-circuit voltage of the battery of the vehicle, i.e., the potential difference between the terminals of the battery.

$R_B$=Internal resistance of the battery.

$R_s$=Resistance across the vehicle's starter motor loop circuit, including the starter motor, the solenoid for the starter motor and the connected electrical wiring system.

$I_L$=Current (load) drawn from the battery by the electrical components of the vehicle.

$R_L$=Lumped resistance of the vehicle's electrical system, excluding the starter loop resistance (This lumped resistance is a non-ohmic resistance).

$V_{OC}$=Open circuit voltage between the terminals of the battery

The DC Voltage source 102 shown in the circuit represents the vehicle's battery. The load drawn by the vehicle's electrical components from the battery is represented by $I_L$. As mentioned earlier, such electrical components may include the climate control system, the infotainment system, the GPS system, the ignition system, headlights, etc. When the engine of the vehicle is placed in the auto-stop mode by the vehicle's start-stop system, such electrical components start drawing power from the vehicle's battery. Hence, the battery starts draining. The total load drawn by the different electrical components of the vehicle may vary, depending on the operating power of those components. Under higher load conditions, where many electrical components of the vehicle, such as the ignition, the radiator fan, heater blowers/air-conditioning system, etc., are running at the same time, the value of $I_L$ may be much higher. In a preferred embodiment, for the purpose of this calculation, the average reference value of the load drawn by the electrical components of the vehicle (i.e., $I_L$) is taken as 90 Amp. However, the value of $I_L$ may vary, based on the operating power required for the different electrical components of the vehicle.

$V_{OC}$ represents the open circuit voltage of the vehicle's battery, which is the potential difference between the terminals of the battery when the battery is not connected to any external circuit. Specifically, $V_{OC}$ corresponds to the case where none of the vehicle's electrical components are drawing power from the battery.

$V_B$ represents the closed-circuit voltage of the battery, when the vehicle's electrical systems are drawing power from the battery, i.e., the battery is connected to an external circuit. The value of '$V_B$' depends on parameters like the type and size of battery, the internal resistance of the battery, the number of cells provided within the battery, the current being drawn from the battery, the battery's temperature, etc.

The symbol '$R_B$' in the shown circuit represents the internal resistance of the battery of the vehicle. The battery is a rechargeable battery, configured to supply electrical energy to the electrical systems of the vehicle. Specifically, the battery is a conventional SLI (starting, lighting and ignition) battery for supplying power to the starter motor, the headlights and the backlights, the indicators, and the ignition system of the vehicle. A typical example of such a battery may be a lead-acid battery, which is conventionally used in automotive vehicles. Those in the art know that a conventionally used automotive SLI battery includes a certain number of galvanic cells connected in series or parallel combination, to provide a desired amount of voltage to the vehicle's electrical systems. In a lead-acid SLI battery, plates of lead, and separate plates of lead-oxide are submerged in an electrolyte solution containing sulphuric acid and water in certain proportions. Further, it is contemplated that other automotive batteries may also be used instead of the lead-acid batteries. The size of the battery may vary, depending on the type and size of the vehicle. In a case where the vehicle is a heavy truck or an SUV, two or more such batteries may be connected in series or in parallel to attain a specific voltage value for operating the electrical systems of the vehicle. Those in the art understand that the battery's charge is used to supply power to electrical components/systems of the vehicle, and the charge gets restored within the battery during the engine's running conditions.

The value of the internal resistance '$R_B$' may increase as the battery ages, i.e., grows older, due to continuous usage. For example, the value of '$R_B$' for a new battery may be much lower than the value for a one year old battery.

The method of the present disclosure measures the internal resistance ($R_B$) of the battery during each engine restart event, for predicting the battery voltage ($V_B$) at the next engine restart event. For this, the state of charge (SOC) of the battery is continuously measured. Any suitable conventional method for measuring the battery's state of charge may be used.

Further, the temperature of the battery is continuously measured through a temperature sensor, to track changes in the internal resistance of the battery ($R_B$). The temperature sensor may be in thermal communication with the ambient air surrounding the battery of the vehicle. Further, one or more temperature sensors may also be coupled to the engine oil, or the coolant of the engine, to have an approximate value of the temperature of the battery. Specifically, once the temperature of the engine oil or the engine coolant is known, a calibrated lookup table may be used to estimate the internal temperature of the battery of the vehicle. Further, the temperature of the battery is obtained at regular instants, to incorporate any change in the internal resistance of the battery of the vehicle, while carrying out the method of the present disclosure.

The value '$R_s$' in the circuit shown in FIG. 1 represents the resistance across the vehicle's starter motor loop circuit, which includes the starter motor, the solenoid for the starter motor, and the connected electrical wiring system. The starter motor is an electric motor commonly used in automotive vehicles, and is coupled to the internal combustion engine of the vehicle. The starter motor is configured to drive the engine during its operations. When the engine is started, the starter motor draws current from the battery of the vehicle, to start the engine, when a start switch of the vehicle is operated.

To maximize availability of the start-stop operation for the vehicle's engine, according to the present disclosure, the starter motor loop circuit resistance ($R_S$) is measured at each restart event for the vehicle's engine, and is used to determine a predicted value for the voltage of the battery ($V_B$) at the next restart event for the engine. The value of $R_s$ varies depending on the temperature/age of the starter motor, the loop wiring, the solenoid for the starter motor, connectors, etc. Appropriate temperature sensors may be coupled to, and positioned in thermal communication with either or more of the engine oil, the engine coolant, the ambient air surrounding the starter motor, to determine the temperature of the loop circuit of the starter motor. Specifically, a dynamically calculated look-up table may be used to find the temperature of the starter motor loop circuit, and the connected components, from the detected temperature of the engine oil or the engine coolant. Further, the temperature of the air surrounding the starter loop circuit may also be an approximate measure of the temperature of the loop circuit. In certain embodiments, an average of the values of the temperature obtained through the look-up table, and the temperature of the ambient air surrounding the loop circuit may also be taken, to have a more precise estimation of the temperature of the loop circuit components.

It is contemplated that once the temperature of the loop circuit of the starter motor is calculated, the resistance of the loop circuit ($R_S$) may be calculated using the coefficient of resistivity of the material of the loop circuit.

The current flowing through the starter motor loop circuit is denoted by $I_S$, and is also the inrush current for the starter motor.

The method of the present disclosure, for maximizing the availability of start-stop operations within a vehicle, continuously measures the voltage of the battery, i.e., $V_B$, and ensures that the value of $V_B$ never goes below a pre-determined minimum value ($V_{B, Min}$), in order to prevent any obstructions in the operation of the electrical components of the vehicle. In a preferred embodiment, the objective of the method is to maintain $V_B$ above 7 Volts when the engine of the vehicle is brought under auto-stop condition by the start-stop system of the vehicle. However, it is contemplated that the pre-determined minimum value for $V_B$, i.e., $V_{B, Min}$, or $V_{threshold}$ may be different in certain embodiments, depending on the operating power required for the electrical components of the vehicle.

The mathematical concept underlying the maximization of the start-stop operations within the vehicle in now explained in conjunction with the electrical circuit of FIG. 1. Applying Kirchoff's current law at node A, we have:

$$I_B = I_L \pm I_S \quad \text{(i)}$$

where:
$I_B$=Current delivered by the battery;
$I_L$=Current (load) drawn by the electrical systems of the vehicle; and
$I_S$=Starter Motor Inrush current value.
Using $I_S = V_B/R_B$ in Eq. (i), we have:

$$I_B = I_L + \frac{V_B}{R_S} \quad \text{(ii)}$$

The Voltage of the battery ($V_B$) and the current delivered by the battery ($I_B$) can be related as follows:

$$V_B = V_{OC} - I_B R_B \quad \text{(iii)}$$

Where, $V_{OC}$=Open Circuit voltage of the battery.
Substituting the value of $I_B$ from Eq. (ii) in Eq. (iii), $$V_B = V_{OC} - \left[I_L + \frac{V_B}{R_S}\right] R_B \quad \text{(iv)}$$

Solving Eq. (iv) for $V_B$, we have:

$$V_B = \frac{V_{OC} - I_L R_B}{1 + R_B/R_S} \quad \text{(v)}$$

Eq. (v) is used by the method of the present disclosure, to continuously calculate the value of $V_B$, i.e., the voltage of the battery of the vehicle. This value is used to determine whether the engine of the vehicle can be stopped after it is in Auto-stop mode, without obstructing the functionality of the electrical systems of the vehicle. Specifically, after the engine of the vehicle is in auto-stop mode, if the Voltage of the battery ($V_B$) falls below the pre-determined minimum value ($V_{B, Min}$), a decision is made to restart the engine. This maximizes the availability of the start-stop operation in the vehicle.

Specifically, using the disclosed concept, the value of the load ($I_L$) extracted by the electrical systems of the vehicle is continuously determined. Hence, the value of $I_s$ is calculated by knowing the dynamic values of Rs and $R_B$. The optimized value of $I_s$ used to predict $V_B$ or $V_{Threshold}$, to maximizing the availability of start-stop feature, and to ultimately improve fuel economy.

Figure 2:
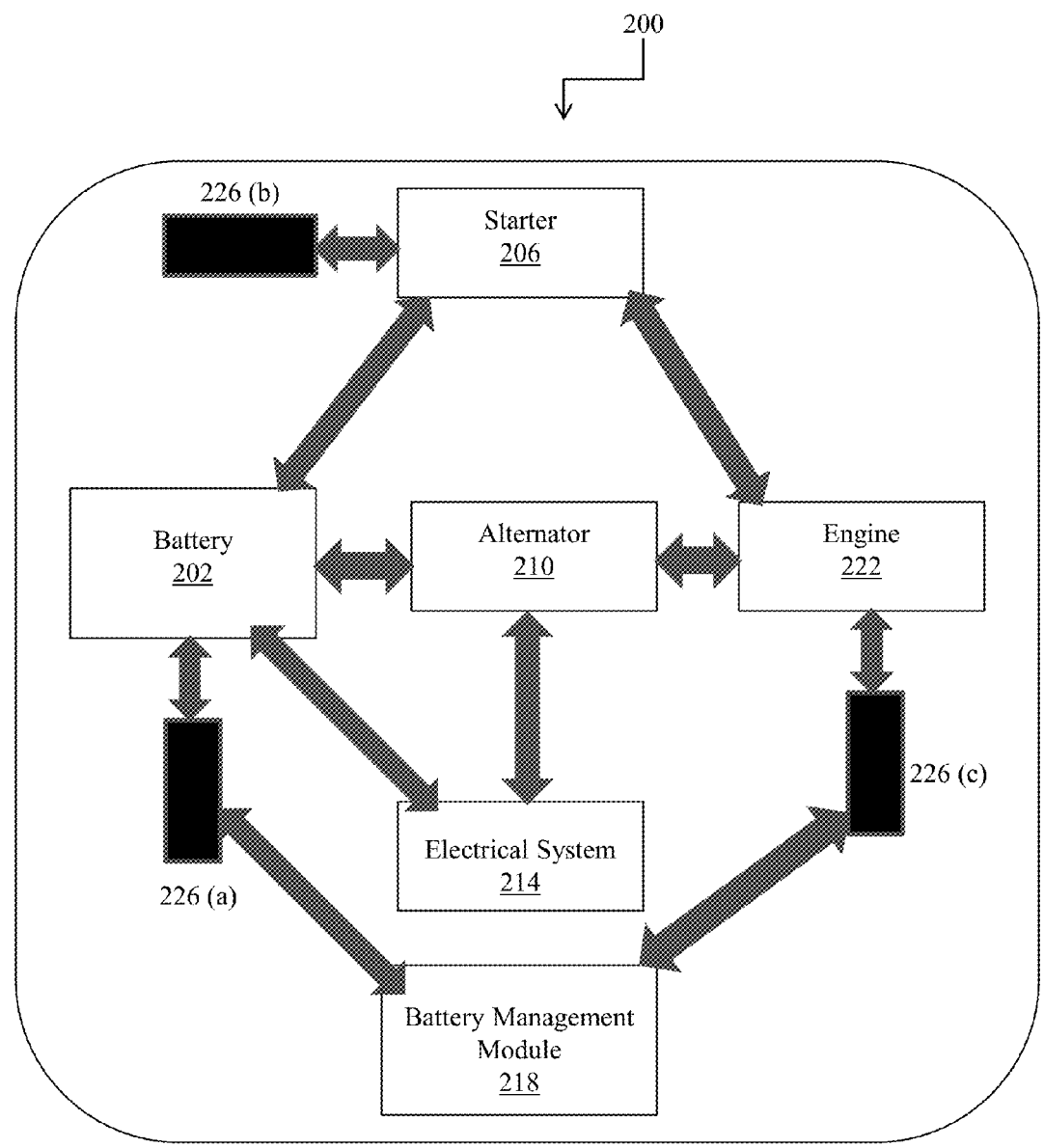
FIG. 2 illustrates an exemplary environment, depicting the components of a vehicle collaborating with each other, and being configured to maximize the availability of the start-stop feature within the vehicle.

FIG. 2 is an exemplary environment, depicting the modules/components of a vehicle 200 collaborating with each other, for maximizing the availability of start-stop operations within a vehicle. The vehicle 200 is a microhybrid electric vehicle, equipped with the auto start-stop technology for the engine. Further, the vehicle 200 may be a car, a Sports Utility Vehicle, a pick-up truck, etc.

A battery 202 is coupled to an electrical system 214 of the vehicle 200. As mentioned earlier, the battery 202 is configured to supply power to the electrical system 214 of the vehicle, especially in cases where the engine 222 of the vehicle is stopped. The electrical system 214 may include components like the air-conditioning system, the music system, the GPS system and the ignition system of the vehicle 200. Further, the battery 202 may be any suitable battery conventionally used in modern automotive vehicles, such as, a lead acid battery or AGM or any other technology. Further, it is contemplated that multiple such batteries 202 can be arranged in a series or parallel combination, to achieve a desired voltage value for igniting and starting the engine, and for delivering power to the electrical system 214.

A starter motor 206 is coupled to the battery 202 and the engine 222 of the vehicle 200, and derives power from the battery 202 of the vehicle. The starter motor 206 is configured to rotate the engine 222 of the vehicle, to initiate the engine's operation under its own power. Further, the starter motor 206 may either use a permanent magnet, or may also be a series-parallel wound direct current electric motor with a starter solenoid mounted on it. On activation of a start-switch, the starter motor 206 draws a specific amount of current (i.e., the starter motor inrush current $I_S$) to drive the engine 222 of the vehicle. Therefore, when the engine 222 is started, the battery 202 must have a certain minimum voltage, to initiate ignition of the engine 222.

An alternator 210 is coupled to the engine 222 and the battery 202. The alternator 210 may either use a permanent magnetic field (i.e., a magneto) to generate alternative current, or may also have a stationary armature coil placed in a rotating magnetic field, to generate electric current. Coupled to the battery 202, the alternator 210 charges the battery 202 when the engine 222 is running, and also powers the electrical system 214 of the vehicle 200 under the engine's running conditions.

Multiple temperature detection sensors 226 (a), 226 (b) and 226 (c) are coupled to the different components of the vehicle. Specifically, the temperature sensor 226 (a) may be in thermal communication with the battery 202, for measuring the temperature of the battery 202. Similarly, temperature sensor 226 (b) is coupled to the starter motor 206, and is configured to measure the temperature of the starter motor loop circuit. In an embodiment, the temperature sensor 226 (b) may be in thermal communication with the air surrounding one or more of the components of the loop circuit for the starter motor 206, to roughly measure the temperature of the loop circuit. That value of temperature detected by the sensor 226 (b) is used to continuously evaluate the resistance of the starter motor loop circuit, as mentioned earlier.

The temperature sensor 226 (c) is coupled to the engine 222 of the vehicle, and is configured to measure the temperature of the engine coolant or the engine oil. The temperature value detected by the temperature sensor 226 (c) can be used for calibration through a look-up table, to estimate the temperature of the starter motor loop circuit.

Specifically, a battery management module 218 is coupled to each of the temperature sensors 226 (a)-226 (c), and it continuously records the temperature values detected by these sensors. The battery management module 218 may have a processor (not shown), which executes a pre-determined algorithm for calculating the voltage of the battery dynamically. For that purpose, the battery management module 218 uses inputs from the temperature sensors 226 (a)-226 (c), to evaluate the instantaneous values of the resistance of the starter motor loop circuit ($R_S$), and the internal resistance of the battery 202 of the vehicle ($R_B$). On determining these values, the battery module 218 uses eventual steps of the algorithm, incorporating Eqs. (i)-(v), to evaluate the instantaneous voltage of the battery 202 of the vehicle. The instantaneous voltage of the battery ($V_B$) is then compared with a fixed pre-determined voltage value ($V_{B,Min}$), as mentioned earlier. This pre-determined voltage value may vary depending on the maximum power required to operate the electrical system 214 of the vehicle. In a case where the instantaneous voltage of the battery ($V_B$) falls below the pre-determined minimum value ($V_{B,Min.}$), the battery management module 218 may generate signals indicating that a start-stop operation for the engine 222 of the vehicle can be carried out. Specifically, after an auto-stop operation for the engine 222 of the vehicle has been carried out, if the instantaneous voltage of the battery ($V_B$) of the vehicle falls below the pre-determined minimum value ($V_{B,Min.}$), the battery management module 218 generates signals for restarting the engine 222 of the vehicle.

The concept above, described in conjunction with the system of FIG. 2, maximizes the utility of the start-stop feature within a vehicle, and ensures that none of the electrical systems/components of the vehicle are operationally affected, during the start-stop operations.

Figure 3:
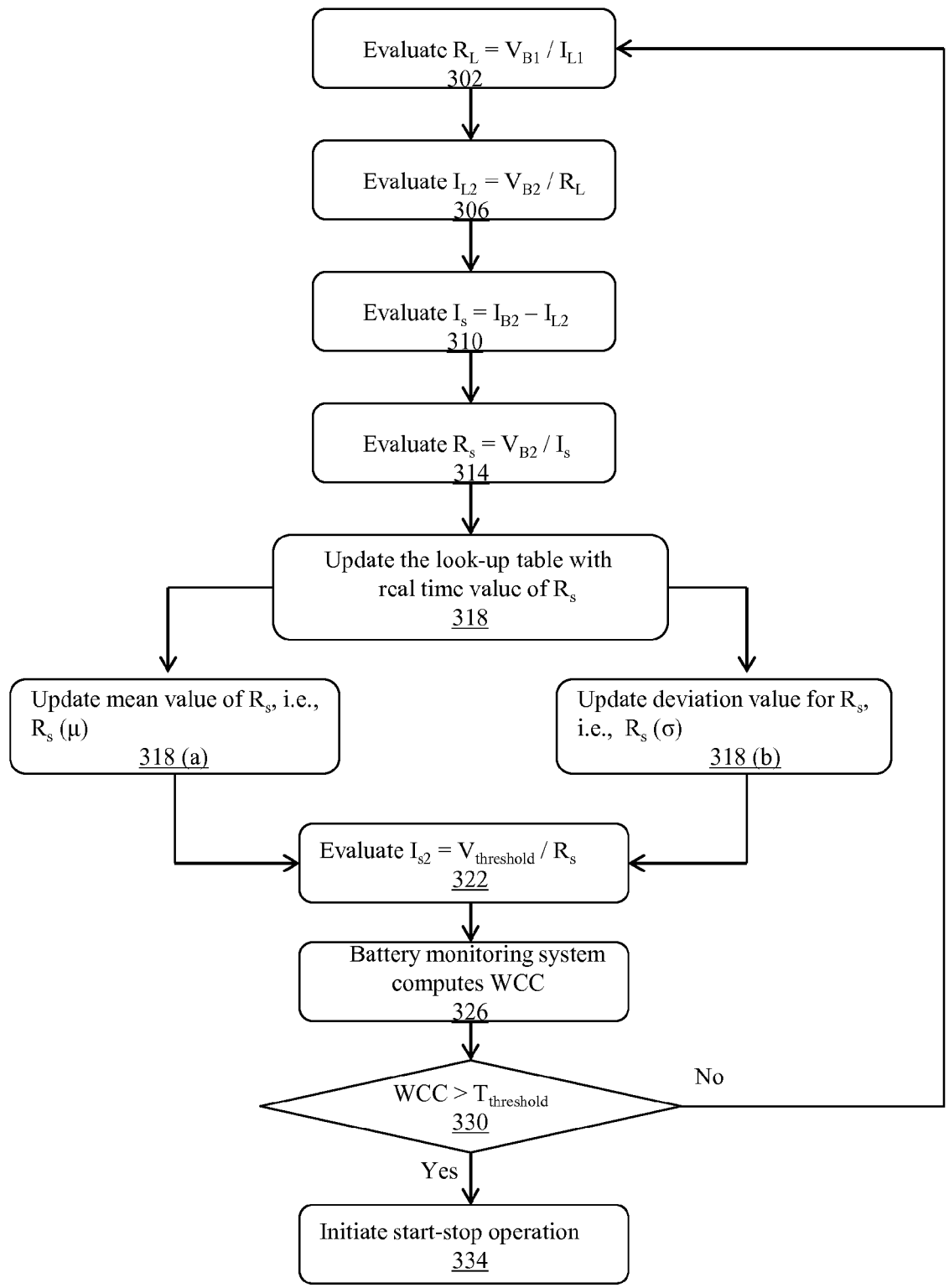
FIG. 3 depicts a flowchart illustrating an exemplary method for maximizing the availability of start-stop operations for the engine of a vehicle, according to an embodiment of the present disclosure.

FIG. 3 is a flowchart, illustrating an exemplary method for maximizing the utility of start-stop operations as implemented within a vehicle, according to another embodiment of the present disclosure. The subscript 1, used in conjunction with/designated to any parameter in the shown flowchart, corresponds to an event 1, where the electrical systems of the vehicle are drawing load from the battery, and when the starter motor for the engine of the vehicle is not activated. Further, the subscript 2, wherever designated to any parameter, corresponds to an event 2, where the starter motor for the engine of the vehicle is activated.

At step 302, the lumped resistance of the vehicle's electrical system ($R_L$), excluding the starter loop resistance, is calculated. The value of $R_L$ is given by:

$$R_L = \frac{V_{B1}}{I_{L1}} \quad \text{(v)}$$

Here, $V_{B1}$ is the voltage of the battery when the electrical systems are drawing load from the battery, and the starter motor is not activated; and $I_{L1}$ is the value of current drawn by the electrical systems of the vehicle when the starter motor for the engine is not activated.

At step 306, the current drawn by the electrical systems of the vehicle ($I_{L2}$) is calculated, when the starter motor for the engine of the vehicle has been activated. On activation of the starter motor, the voltage of the battery of the vehicle changes to $V_{B2}$, and hence, a different value ($I_{L2}$) of the current is drawn by the electrical systems, which is given by:

$$I_{L2} = \frac{V_{B2}}{R_L} \quad \text{(vi)}$$

At step 310, the inrush current value at the starter motor loop circuit ($I_s$) of the vehicle is calculated using the value of $I_{L2}$ obtained from Eqn. (vi), as:

$$I_s = I_{B2} - I_{L2} \quad \text{(vii)}$$

At step 314, the method calculates the resistance of the starter motor loop circuit ($R_S$) using the value of the current $I_s$ obtained from Eqn. (vii), as:

$$Rs = \frac{V_{B2}}{I_s} \quad \text{(viii)}$$

At step 318, the method updates the value of $R_s$ obtained from Eqn. (viii) above, in a look-up table. The look-up table may have a set of pre-stored values of the resistance of the starter motor loop circuit, based on factors like the ambient temperature of the battery, and the temperature of the engine oil/coolant. Each time the value of $R_s$ is calculated, the look-up table is updated, and the pre-stored values are incorporated with the new calculated value of $R_s$, to have a more accurate and precise data. In an embodiment, the method calculates and notes down both a mean value for $R_s$, i.e., $R_s(\mu)$, as shown in step 318 (a), and a deviation value for $R_s(\sigma)$, as shown in step 318 (b), to incorporate any changes in the value of $R_s$. The value of $R_s$ may then be presumed to lie within the range $R_s(\mu) +/- R_s(\sigma)$.

A battery management module of the vehicle may have a processor configured to continuously update the look-up table, to obtain real time precise value of $R_s$.

At step 322, the method calculates the inrush current value for the starter motor loop circuit ($I_{s2}$), when the starter motor for the engine of the vehicle is in the activated state. A threshold value for the voltage of the battery ($V_{B, Threshold}$) is used to calculate $I_{s2}$ as:

$$I_{S2} = \frac{V_{Threshold}}{R_S} \quad (ix)$$

In an embodiment, the predetermined threshold value for the voltage of the battery ($V_{B, Threshold}$), is about seven volts, to avoid obstructions in the operating conditions of the different electrical systems of the vehicle, when the engine stop-start operations are carried out. However, those in the art can contemplate that the value of $V_{B, Threshold}$, may vary in certain embodiments, based on factors like the power required to operate the different electrical systems of the vehicle.

At step 326, the battery monitoring system of the vehicle computes the value of a quantity WCC, which has the units of time. At step 330, the computed value of the quantity WCC is compared with a pre-determined threshold time value ($T_{Threshold}$). In a case where the value of WCC exceeds $T_{Threshold}$, the start-stop operation for the engine of the vehicle is initiated at step 334. Else, the method goes back to step 302, and keeps on tracking the values of the different parameters, as aforementioned, to maximize the availability of the start-stop operations in the vehicle.

The method of the present disclosure is implementable and advantageous for any microhybrid electric vehicles equipped with the start-stop feature, including cars, SUVs, pick-up trucks, etc.

Although the current invention has been described comprehensively, in considerable details to cover the possible aspects and embodiments, those skilled in the art would recognize that other versions of the invention may also be possible. Though, different embodiments of the present disclosure have been set forth above, and different constructions of the invention have been depicted in the appended drawings, however, the disclosed embodiments are not intended to define or limit the scope of the disclosure, such limitation being solely contained in the claims appended hereto, and therefore, other embodiments for carrying out the invention are also possible.

What is claimed is:

1. A method of maximizing usage of start-stop operation for a vehicle equipped with a start-stop system and having an engine, a battery, and electrical components, and further having a battery management module including a processor, the method comprising:
   measuring an electric current ($I_L$) drawn by a set of electrical components of the vehicle, from the battery;
   determining an internal resistance of the battery of the vehicle ($R_B$), employing the battery management module, utilizing inputs from one or more temperature sensors positioned to monitor the battery temperature;
   determining a resistance of a starter motor loop circuit ($R_S$) coupled to the engine and the battery of the vehicle, employing the battery management module, utilizing inputs from one or more temperature sensors positioned to monitor the loop circuit temperature; and
   calculating a closed-circuit voltage of the battery of the vehicle ($V_B$), using the current drawn by the set of electrical component ($I_L$), the internal resistance of the battery ($R_B$), and the resistance of the starter motor loop circuit ($R_S$), employing the processor; and
   carrying out the start-stop operation for the engine of the vehicle if the closed-circuit voltage of the battery of the vehicle is predicted to be above a pre-determined value.

2. The method of claim 1, comprising, using an open-circuit voltage ($V_{OC}$) of the battery of the vehicle as a parameter to calculate the closed-circuit voltage ($V_B$) of the battery.

3. The method of claim 1, further comprising, measuring the temperature of a coolant for the engine of the vehicle, and the temperature of the air surrounding one or more components of the vehicle constituting the starter motor loop circuit, to determine the resistance of the starter motor loop circuit ($R_s$).

4. The method of claim 1, further comprising, continuously determining the internal resistance of the battery ($R_B$) and the resistance of the starter motor loop circuit ($R_s$), after an auto-stop condition for the vehicle's engine has occurred, to predict restart conditions for the engine.

5. The method of claim 1, wherein the pre-determined value for the closed-circuit voltage of the battery is greater than 7 Volts.

6. The method of claim 1, wherein the pre-determined value for the closed-circuit voltage of the battery depends on the cumulative power required to operate the set of electrical components of the vehicle, when an auto-stop operation for the engine of the vehicle has been initiated.

7. The method of claim 1, wherein the vehicle is a microhybrid electric vehicle.

* * * * *